United States Patent [19]
[11] 4,149,172
Heinzl et al.
[45] Apr. 10, 1979

[54] INK SUPPLY SYSTEM FOR PIEZOELECTRICALLY OPERATED PRINTING JETS

[75] Inventors: Joachim Heinzl; Erich Kattner; Guenther Rosenstock, all of Munich, Fed. Rep. of Germany

[73] Assignee: Siemens Aktiengesellschaft, Berlin & Munich, Fed. Rep. of Germany

[21] Appl. No.: 639,119

[22] Filed: Dec. 9, 1975

[30] Foreign Application Priority Data

Dec. 20, 1974 [DE] Fed. Rep. of Germany ....... 2460573

[51] Int. Cl.[2] ............................................ G01D 15/18
[52] U.S. Cl. ............................................ 346/140 R
[58] Field of Search .............................. 346/75, 140 R

[56] References Cited

U.S. PATENT DOCUMENTS

| | | | |
|---|---|---|---|
| 3,708,118 | 1/1973 | Keur | 346/75 X |
| 3,761,953 | 9/1973 | Helgeson et al. | 346/140 R X |
| 3,786,517 | 1/1974 | Krause | 346/75 |
| 3,831,727 | 8/1974 | Kruspe et al. | 346/75 X |
| 3,832,579 | 8/1974 | Arndt | 346/140 X |
| 3,929,071 | 12/1975 | Cialone et al. | 101/335 |
| 3,953,862 | 4/1976 | Amberntsson | 346/140 R |

*Primary Examiner*—George H. Miller, Jr.
*Attorney, Agent, or Firm*—Hill, Gross, Simpson, Van Santen, Steadman, Chiara & Simpson

[57] ABSTRACT

Ink supply system for supplying a stream of ink from an ink reservoir to a piezoelectrically operated printing jet of an ink jet printer. The system includes a conduit interconnecting the reservoir to the printing jet in which is mounted a capillary filter. The conduit includes an elastic portion on the downstream side of the capillary filter and a ventable air receiver on the upstream side thereof.

1 Claim, 4 Drawing Figures

INK SUPPLY SYSTEM FOR PIEZOELECTRICALLY OPERATED PRINTING JETS

BACKGROUND OF THE INVENTION

This invention relates generally to the field of ink jet printers and more particularly to an ink supply system for supplying ink from an ink reservoir to a piezoelectrically operated printing jet employed in ink jet printers.

Generally, in ink jet printers using piezoelectrically operated printing jets, the printing liquid (usually ink) is drawn from a reservoir and supplied to a printing jet. Typically, the printing jet comprises a thin walled hollow tube surrounded by a tubular piezoelectric transducer which contracts upon excitation by a voltage pulse. A resultant pressure wave forces a drop of ink to issue from the orifice of the printing jet. Depending upon the type of system used, printing is carried out either by several printing jets (as are used in mosaic printers), so that the ink droplets impact directly upon the data carrier, or by using only a single printing jet, the ink droplets issuing therefrom being charged by a strong electric field, accelerated and deflected by a deflector device in accordance with the cycle of operation of a character generator, as will be understood by those skilled in the art.

In order to provide an undisturbed printing operation it is necessary to prevent fluctuations in the compressibility of the liquid (ink) enclosed within the printing jet, which may arise by virtue of the entrapment of air in the liquid. Such trapped air (in the form of small bubbles) or possibly other foreign bodies contained within the printing liquid may result in failure of the printing jet. The undesirable gas can penetrate into the printing jet in two ways, either in the form of air bubbles entrained within the liquid or by ingress through the jet orifice when the printing jet is vibrated.

Ink jet printers are known in which ink is supplied to a printing jet from an ink tank through an ink duct, and expelled from the printing jet to effect printing. Such known jet printers may include a mechanism for removing air entrained within the ink, consisting of an intermediate vessel connected to a first ink duct, through which ink is supplied to the vessel. The vessel itself comprises an upwardly flaring or expanding portion, and to the base of the vessel is connected a second duct, through which ink is supplied to the printing jet. By alternately opening and closing a valving arrangement associated with the ink lines, and in combination with an air receiver, the air contained in the ink can be removed.

Also known in connection with such jet printers is an ink reservoir comprising a flexible ink bag for receiving the ink, which bag comprises, at the upper portion thereof, an ink-filter distributor in which an air bubble is entrapped for regulating the pressure fluctuations within the distributor. The air bubbles entrained within the ink are collected in the upper portion and can be vented through the cover of the distributor.

Such known systems for removing entrained air and attenuating pressure waves and variations are somewhat complicated and consequently relatively expensive in manufacture.

SUMMARY OF THE PRESENT INVENTION

An object of the present invention is to provide an ink supply system for supplying ink to piezoelectrically operated printing jets of an ink jet printer, which system is relatively simple and inexpensive, and removes air entrapped in the printing liquid and prevents the penetration of air or other foreign bodies into the printing jets.

In addition, the ink supply system of the present invention prevents the propagation of pressure waves within the system, and furthermore precludes an emptying of the ink supply system.

Briefly, the present invention may be summarized as comprising an ink supply system for a piezoelectrically operated printing jet in which a capillary filter is provided for filtering out air entrained within the ink. In one embodiment of the invention the capillary filter comprises a mesh which is sufficiently fine to produce the requisite capillary action, and at least one narrow line or conduit section associated therewith. In other embodiments the capillary filter may comprise ceramic material or sintered nickel-chrome steel. By virtue of the capillary filters the air bubbles contained in the printing liquid are filtered out, upstream of the printing jet, in a simple, inexpensive manner.

In accordance with the principles of the present invention, an "elastic" conduit interconnects the capillary filter and the printing jet. In addition, and on the upstream side of the capillary filter is provided an air receiver for receiving the air which is removed from the printing liquid by the capillary filter.

By virtue of the present invention any air entrapped in the ink is removed upstream of the printing jet and air is prevented from entering the printing jet through the orifice thereof. In addition the present invention prevents the propagation of pressure fluctuations within the ink supply system and further prevents the ink supply system from running empty.

By virtue of the piezoelectrically operated printing jet, in combination with the capillary filter of the present invention, it is possible to dispense with a pumping mechanism for delivering the ink from the ink reservoir to the printing jet. Furthermore, the "elastic" conduit which is disposed between the capillary filter and the printing jet serves as a buffer or pressure wave attenuator. The "elastic" conduit may conveniently be formed of a resilient tube or, also in accordance with the principles of the present invention, may include a rigid, non-resilient riser tube which entraps a determinate quantity of air at the upper end thereof to provide an air cushion.

In addition to performing the function of removing air contained within the printing liquid and dampening the pressure waves produced therein, the capillary filter system of the present invention prevents the ink supply from running empty. Since generally the ink supply reservoir is located beneath the printing jet to produce at the printing jet the requisite static vacuum for printing operations, a failure in the pumping mechanism results in a depletion of the ink in the ink supply system. In such circumstances, the entire ink supply system must be bled before the printing operation is resumed. By virtue of the capillary filter, however, the ink is continually drawn through the ink supply system regardless of the failure of a pumping mechanism.

The capillary filter arrangement of the present invention also increases the efficiency of the printing jet. Thus, when the tubular piezoelectric transducer contracts, the compressive energy serves to displace the printing liquid primarily in the direction of the printing jet orifice.

Also in accordance with the principles of the present invention, a second capillary filter may be arranged immediately upstream of the printing jet. This arrangement may render more reliable the printing operation of ink jet printers which are subjected to particularly heavy mechanical loads. In ink jet printers in which a plurality of printing jets are arranged in a printer head in order to perform a printing function similar to that performed by the needles of a mosaic printer, the utilization of the capillary filter of the present invention simplifies the requisite undisturbed operation of each individual printer jet. Thus as a consequence of the present invention the printing jets cannot adversely influence one another as a consequence of the pressure waves developed during printing operations.

Additional details and features of the present invention, along with other objects and advantages, will be readily apparent from the following description of certain preferred embodiments thereof, taken in conjunction with the accompanying drawings, although variations and modifications may be effected without departing from the spirit and scope of the novel concepts herein disclosed.

DESCRIPTION OF THE PREFERRED EMBODIMENTS

Figure 1:
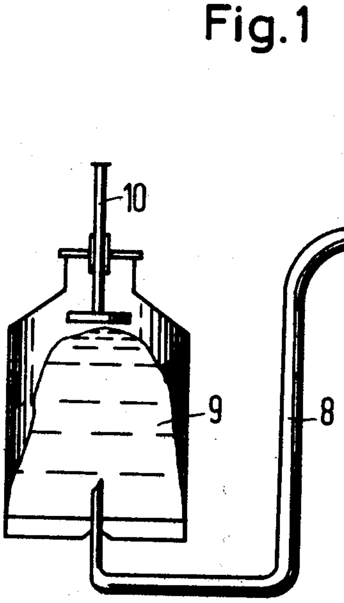
FIG. 1 is a schematic view of an ink supply system constructed in accordance with the principles of the present invention.
Figure 1:
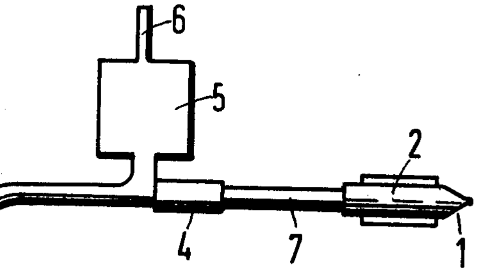

FIG. 1 is illustrative of a printing system which utilizes piezoelectrically operated printing jets and which would, in operation, generally be mounted on the printer carriage of an ink jet printer. Typically, the printing system would be moved by means of a drive mechanism in a line direction along the data carrier which is being printed.

The overall printing system illustrated in FIG. 1 comprises a printing jet 1, consists of a small tube made of glass or synthetic material and is surrounded by a tubular piezoelectric transducer 2 which forces the printing liquid (generally ink) to issue drop by drop from the nozzle orifice of the printing jet as the transducer contracts in accordance with the cycle of operation of a pulse generator, in a manner known to those skilled in the art. As a consequence of the small pumping volume of the piezoelectric transducer, any air which may be entrained in the printing liquid as it is conducted to the printing jet will result immediately in a breakdown of the printing jet. In the circumstances it is essential to provide some means for removing air from the printing liquid prior to the delivery thereof to the printing jet 1.

In accordance with the principles of the present invention, and upstream of the printing jet 1, there is provided a capillary filter 4, the individual capillaries of which are of such small diameter that any air bubbles or foreign bodies entrained in the printing liquid are intercepted, the air being collected in an air receiver 5 immediately upstream of the capillary filter 4. The air receiver 5 is provided with a venting device 6 by which the air may be periodically vented from the receiver 5.

The individual capillaries of the capillary filter 4 must be of sufficient size (about 30 $\mu$) to ensure undisturbed operation and also to ensure that the capillaries are not too readily blocked.

In accordance with the principles of the present invention, the capillary filter 4 may be advantageously formed of sintered nickel-chrome steel in which the individual cavities are in communication with one another. In addition, the capillary filter 4 may be formed of porous ceramic material or simply a mesh of steel or synthetic material with a mesh size of about 30 $\mu$, followed by a narrow diameter tube. The purpose of the tube is to attenuate pressure waves which may be generated by the mesh to prevent them from propagating from the capillary filter to the printing jet 1.

Disposed in fluid flow communication between the capillary filter 4 and the printing jet 1 is an "elastic" conduit 7, which not only serves as a buffer between the capillary filter 4 and the printing jet 1, but also performs the function of compensating pressure oscillations in the printing liquid.

Figure 4:
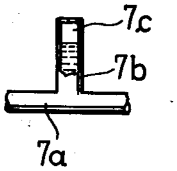
FIG. 4 illustrates another embodiment of the "elastic" conduit between the capillary filter and the printing jet.

The "elastic" conduit 7 may be formed of resilient material, as shown in FIG. 1, or, as shown in FIG. 4, may comprise a rigid structure comprising a flow-through conduit *7a* and a riser *7b* extending vertically upwardly therefrom, entrapping at the upper end *7c* thereof a determinate quantity of air for serving as an air cushion.

Figure 3:
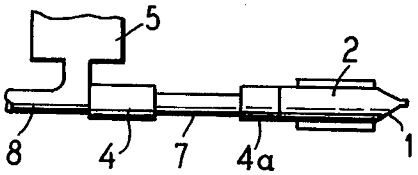
FIG. 3 illustrates schematically another embodiment of that portion of the ink supply system immediately upstream of the printing jet.

FIG. 3 illustrates another embodiment of the invention wherein a second capillary filter *4a* is located downstream of a first capillary filter 4 and immediately upstream of the printing jet 1. This arrangement is particularly suitable in ink jet printers which are subjected to particularly heavy mechanical loads to ensure reliable printing operation.

Referring again to FIG. 1, the printing liquid is supplied from a reservoir 9 through a conduit 8 and the capillary filter 4 to the printing jet 1. By virtue of the pumping action of the piezoelectric transducer 2, an independent pumping system for supplying the printed liquid to the printing jet 1 is obviated. On the other hand, a hand pump 10 may be provided in association with the reservoir 9 to fill the system with printing liquid at the time of commencement of a printing operation. Furthermore, if as a consequence of severe vibrations, air has reached the printing jet 1 to produce a fault in the printing operation, the printing jet 1 may be filled with printing liquid to remove the air by virtue of the operation of the hand pump 10.

Figure 2:
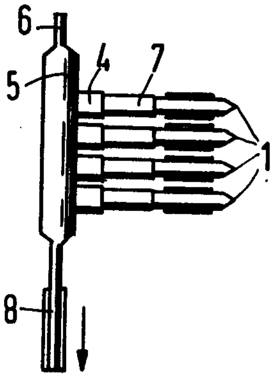
FIG. 2 schematically illustrates another embodiment of the invention in which a plurality of printing jets are arranged to perform a printing function in the manner of the needles of a mosaic printer.

FIG. 2 illustrates another embodiment of the invention in which several printing jets 1 are connected in parallel in an ink supply system. In the embodiment illustrated, the printing jets 1, and their associated capillary filters 4 and elastic tubes 7, are mounted on the vertical side wall of an air receiver 5. The plurality of printing jets 1 shown in the embodiment illustrated in FIG. 2 serve to produce a printing operation similar to that of a needle printer, and thus mosaic printing may be carried out without the need of special electrical deflection devices for deflecting the drops of ink. The capillary filters 4, in addition to performing the salutary functions described hereinabove, also serve to inhibit the influence of the operation of one printing jet upon the operation of another. It is therefore possible to effect precise control of each of the individual printing jets 1.

Although minor modifications might be suggested by those versed in the art, it should be understood that we wish to embody within the scope of the patent warranted hereon all such modifications as reasonably come within the scope of our contribution to the art.

What we claim is:

1. An ink jet printer comprising a piezoelectrically operated printing jet including a piezoelectric transducer, an ink reservoir disposed at a level lower than said printing jet and said piezoelectric transducer to produce a static vacuum condition at said printing jet, conduit means operatively interconnecting said printing jet and said reservoir, a capillary filter mounted in said conduit in close proximity to said printing jet and above said ink reservoir for removing air from the ink as it flows from said reservoir to said printing jet and for preventing the depletion of ink in said conduit on the upstream side of said capillary filter upon penetration of air into said printing jet, and an air receiver and vent mounted in said conduit upstream of said capillary filter immediately at an upstream face of the filter vertically above the face for receiving air removed from the ink by said capillary filter.

* * * * *